United States Patent
Ribarov

(10) Patent No.: US 11,480,105 B2
(45) Date of Patent: Oct. 25, 2022

(54) INTEGRATED THERMAL MANAGEMENT SYSTEM FOR FUEL COOLING

(71) Applicant: United Technologies Corporation, Farmington, CT (US)

(72) Inventor: Lubomir A. Ribarov, West Hartford, CT (US)

(73) Assignee: RAYTHEON TECHNOLOGIES CORPORATION, Farmington, CT (US)

(*) Notice: Subject to any disclaimer, the term of this patent is extended or adjusted under 35 U.S.C. 154(b) by 316 days.

(21) Appl. No.: 16/843,288

(22) Filed: Apr. 8, 2020

(65) Prior Publication Data

US 2020/0332714 A1    Oct. 22, 2020

Related U.S. Application Data

(60) Provisional application No. 62/835,045, filed on Apr. 17, 2019.

(51) Int. Cl.
| | |
|---|---|
| *F02C 7/14* | (2006.01) |
| *B64D 33/08* | (2006.01) |
| *F25B 1/08* | (2006.01) |
| *F25B 49/02* | (2006.01) |
| *B64D 13/06* | (2006.01) |

(52) U.S. Cl.
CPC ............... *F02C 7/14* (2013.01); *B64D 33/08* (2013.01); *F25B 1/08* (2013.01); *F25B 49/025* (2013.01); *B64D 2013/0607* (2013.01); *F05D 2260/213* (2013.01)

(58) Field of Classification Search
CPC ... F02C 7/14; B64D 33/08; B64D 2013/0607; F25B 1/08; F25B 49/025; F05D 2260/213
See application file for complete search history.

(56) References Cited

U.S. PATENT DOCUMENTS

| | | | | |
|---|---|---|---|---|
| 4,209,993 | A * | 7/1980 | Rannenberg | B64D 13/06 62/239 |
| 4,777,793 | A * | 10/1988 | Weigand | F02C 7/32 60/39.27 |
| 6,182,435 | B1 * | 2/2001 | Niggemann | F01D 25/12 60/730 |
| 6,948,331 | B1 | 9/2005 | Ho | |
| 8,042,343 | B2 | 10/2011 | Järlestål | |

(Continued)

FOREIGN PATENT DOCUMENTS

WO    2018055307 A1    3/2018

OTHER PUBLICATIONS

European Search Report for European Application No. 20167204.5 dated Sep. 14, 2020.

*Primary Examiner* — Shafiq Mian

(74) *Attorney, Agent, or Firm* — Carlson, Gaskey & Olds, P.C.

(57) ABSTRACT

A thermal management system for a gas turbine engine includes a primary vapor compression system including a primary evaporator defining thermal communication between a primary refrigerant and a flow of fuel to cool the fuel. A boost vapor compression system includes a boost heat exchanger defining thermal communication between the primary refrigerant. A boost refrigerant cools the primary refrigerant and a boost condenser in thermal communication with an air stream cools the boost refrigerant.

10 Claims, 2 Drawing Sheets

(56) References Cited

U.S. PATENT DOCUMENTS

| | | |
|---|---|---|
| 10,207,809 B2 | 2/2019 | Koerner et al. |
| 10,352,190 B2 * | 7/2019 | Garassino .............. F01M 5/00 |
| 2010/0313591 A1 | 12/2010 | Lents et al. |
| 2011/0219786 A1 | 9/2011 | Andres et al. |
| 2017/0217592 A1 * | 8/2017 | Hinderliter ............ B64D 13/08 |
| 2017/0233082 A1 * | 8/2017 | Behrens ................ B64D 13/06 62/7 |
| 2018/0094584 A1 | 4/2018 | Chalaud |
| 2018/0230948 A1 * | 8/2018 | Kwak ...................... F02K 9/46 |
| 2019/0128189 A1 * | 5/2019 | Rambo .................. F02K 3/077 |
| 2020/0088099 A1 * | 3/2020 | Roberge .................. F02C 7/16 |

* cited by examiner

INTEGRATED THERMAL MANAGEMENT SYSTEM FOR FUEL COOLING

CROSS-REFERENCE TO RELATED APPLICATIONS

This application claims priority to U.S. Provisional Application No. 62/835,045 which was filed on Apr. 17, 2019.

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow that expands through the turbine section to drive the compressor and the fan section.

Thermal loads generated during engine operation are cooled utilizing ram air flow, engine bleed air flow, and fuel flow. The use of ram air flow is limited due to an increase in aerodynamic parasitic friction (i.e., "ram air drag"). The use of engine bleed air flow is limited due to efficiency penalties incurred by drawing airflow from parts of the engine. Fuel degrades at high temperatures and therefore also has a limited practical capacity to absorb heat. In addition, during flight, as the fuel is consumed by the engines, the fuel's mass availability decreases, and, hence, the fuel's availability as a heat sink is diminished.

Turbine engine manufacturers continue to seek further improvements to engine performance including improvements to thermal transfer efficiencies.

SUMMARY

A thermal management system for a gas turbine engine includes, among other possible things, a primary vapor compression system including a primary evaporator defining thermal communication between a primary refrigerant and a flow of fuel to cool the fuel; and a boost vapor compression system including a boost heat exchanger defining thermal communication between the primary refrigerant. A boost refrigerant cools the primary refrigerant and a boost condenser in thermal communication with an air stream cools the boost refrigerant.

In a further embodiment of the foregoing thermal management system, the primary vapor compression system further includes a primary compressor driven by a first electric motor and the boost vapor compression system includes a boost compressor driven by a second electric motor. At least one of the first electric motor and the second electric motor is cooled by a flow of fuel.

In another embodiment of any of the foregoing thermal management systems, the boost heat exchanger functions as a condenser for the primary vapor compression system and as an evaporator for the boost vapor compression system.

In another embodiment of any of the foregoing thermal management systems, a first valve controls a flow of fuel to the primary evaporator.

In another embodiment of any of the foregoing thermal management systems, a temperature sensor measures a temperature of the fuel upstream of the first valve. A controller receives information from the temperature sensor and operating the first valve to control the flow of fuel to maintain the fuel within a predefined temperature range.

In another embodiment of any of the foregoing thermal management systems, a cold plate is in thermal communication with at least one of the booster heat exchanger or the primary evaporator for cooling a secondary coolant flow.

In another embodiment of any of the foregoing thermal management systems, an ejector provides a flow of cooling air to the boost condenser.

A gas turbine engine according to an exemplary embodiment of this disclosure includes, among other possible things, a fuel system providing a flow of fuel to a combustor, and a thermal management system for maintaining the fuel within a predefined temperature range. The thermal management system includes a primary vapor compression system which includes a primary evaporator that defines the thermal communication between a primary refrigerant and a flow of fuel to cool the fuel. A boost vapor compression system includes a boost heat exchanger, which defines thermal communication between the primary refrigerant and a boost refrigerant to cool the primary refrigerant and a boost condenser in thermal communication with an air stream to cool the boost refrigerant.

In a further embodiment of the foregoing gas turbine engine, the primary vapor compression system further includes a primary compressor driven by a first electric motor. The boost vapor compression system includes a boost compressor driven by a second electric motor and at least one of the first electric motor and the second electric motor is cooled by a flow of fuel.

In a further embodiment of any of the foregoing gas turbine engines, the fuel system includes a boost pump drawing fuel from a fuel tank and communicating fuel to a primary fuel pump that provides the flow of fuel to the combustor. A first valve controls a flow of fuel to the primary evaporator. A temperature sensor measures a temperature of the fuel upstream of the first valve and a controller receiving information from the temperature sensor and operating the first valve to control the flow of fuel to maintain the fuel within the predefined temperature range.

In a further embodiment of any of the foregoing gas turbine engines, the primary vapor compression system further includes a primary compressor driven by a first electric motor. The boost vapor compression system includes a boost compressor driven by a second electric motor. At least one of the first electric motor and the second electric motor is cooled by a flow of fuel and the first valve is disposed downstream of the at least one of the electric motor and the second electric motor cooled by the flow of fuel.

In a further embodiment of any of the foregoing gas turbine engines, a secondary fuel pump generates a fuel flow to cool the at least one of the first electric motor and the second electric motor and a pressure regulating valve for maintaining a pressure of the flow of fuel.

In a further embodiment of any of the foregoing gas turbine engines, the boost heat exchanger functions as a condenser for the primary vapor compression system and as an evaporator for the boost vapor compression system.

In a further embodiment of any of the foregoing gas turbine engines, an ejector provides a flow of cooling air to the boost condenser.

In a further embodiment of any of the foregoing gas turbine engines, air warmed through the booster condenser is directed to a system that utilizes warmer air.

In a further embodiment of any of the foregoing gas turbine engines, a cold plate is in thermal communication with at least one of the booster heat exchanger or the primary evaporator for providing cooling of another aircraft system.

A method of managing thermal properties of a fuel for a gas turbine engine according to an exemplary embodiment of this disclosure includes, among other possible things, routing a flow of fuel through a primary evaporator of a primary vapor compression system to cool the fuel. A flow of a primary refrigerant of the primary vapor compression system is routed into thermal communication of a boost refrigerant within of a boost vapor compression system within a boost heat exchanger for cooling the primary refrigerant. The boost heat exchanger functions as a condenser for the primary vapor compression system and as an evaporator for the boost vapor compression system. At least one valve operates to control the flow of fuel into the primary evaporator to maintain the flow of fuel within a predefined temperature range.

In a further embodiment of the foregoing method of managing thermal properties of a fuel for a gas turbine engine, the boost refrigerant is cooled with an air stream through a boost condenser.

In a further embodiment of any of the foregoing methods of managing thermal properties of a fuel for a gas turbine engine, operation of a primary compressor of the primary vapor compression system is controlled with a first electric motor. Operation of a boost compressor of the boost vapor compression system is controlled with a second electric motor to control the transfer of heat from the fuel flow to the air stream.

In a further embodiment of any of the foregoing methods of managing thermal properties of a fuel for a gas turbine engine, a secondary system is cooled with a cold plate in thermal communication with at least one of the booster heat exchanger or the primary evaporator for cooling a secondary coolant flow.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
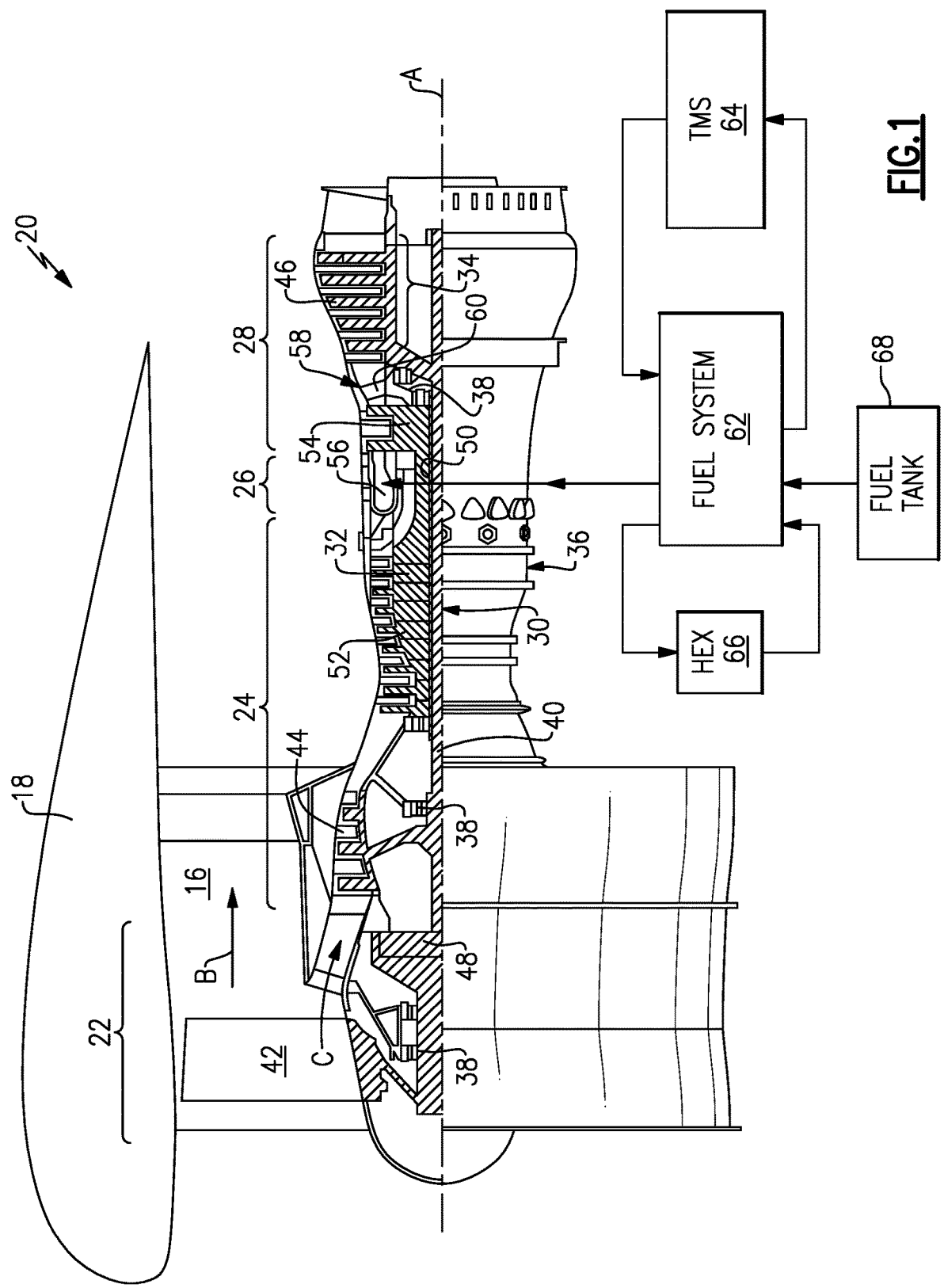
FIG. 1 is a schematic view of an example gas turbine engine.

FIG. 1 schematically illustrates a gas turbine engine 20 for powering an aircraft. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct 16 defined radially within a nacelle 18. The fan section 22 also drives air along a core flow path C for compression and communication into the combustor section 26 where the air is mixed with fuel and ignited to generate a high-energy gas flow that expands through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that the various bearing systems 38 may alternatively or additionally be provided at different locations, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to a fan section 22 through a speed change mechanism, which in exemplary gas turbine engine 20 is illustrated as a geared architecture 48 to drive fan blades 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 58 of the engine static structure 36 may be arranged generally between the high pressure turbine 54 and the low pressure turbine 46. The mid-turbine frame 58 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 58 includes airfoils 60 which are in the core airflow path C. The turbines 46, 54 rotationally drive the respective low speed spool 30 and high speed spool 32 in response to the expansion of the combustion gases. It will be appreciated that each of the positions of the fan section 22, compressor section 24, combustor section 26, turbine section 28, and fan drive gear system 48 may be varied. For example, gear system 48 may be located aft of the low pressure compressor 44 and the fan blades 42 may be positioned forward or aft of the location of the geared architecture 48 or even aft of turbine section 28.

The engine 20 in one example is a high-bypass geared aircraft engine. In a further example, the engine 20 bypass ratio is greater than about six (6:1), with an example embodiment being greater than about ten (10:1), the geared architecture 48 is an epicyclic gear train, such as a planetary gear system or other gear system, with a gear reduction ratio of greater than about 2.3 and the low pressure turbine 46 has a pressure ratio that is greater than about five (5:1). In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 m), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about (1.45:1). "Low corrected fan tip speed" is the actual fan tip speed in ft/sec divided by an industry standard temperature correction of $[(\text{Tram }° \text{R})/(518.7° \text{R})]^{0.5}$. The "Low corrected fan tip speed" as disclosed herein according to one non-limiting embodiment is less than about 1150 ft/s (350.5 m/s).

The example gas turbine engine includes the fan section 22 that comprises in one non-limiting embodiment less than about 26 fan blades 42. In another non-limiting embodiment, the fan section 22 includes less than about 20 fan blades 42. Moreover, in one disclosed embodiment the low pressure turbine 46 includes no more than about 5 turbine rotors schematically indicated at 34. In another disclosed embodiment, the low pressure turbine includes about 6 rotors. In another non-limiting example embodiment, the low pressure turbine 46 includes about 3 turbine rotors. In yet another disclosed embodiment, the number of turbine rotors for the low pressure turbine 46 may be between 3 and 6. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

The engine includes a fuel system 62 that directs fuel from a fuel tank 68 to the combustor 56. Fuel is utilized as a coolant to other systems and is routed through at least one heat exchanger as is schematically shown at 66. As is appreciated, one or several heat exchangers 66 could be included to place a flow of fuel into thermal communication with a hot flow that requires cooling.

Fuel provides a favorable medium for transference of thermal energy because preheated fuel provides for increased combustor efficiency. The thermal capacity of the fuel is limited because elevated temperatures can degrade the fuel and result in undesirable fuel thermal decomposition. Accordingly, the engine 20 includes a thermal management system 64 that cools fuel flow and increase the capacity of the fuel to accept heat.

Figure 2:
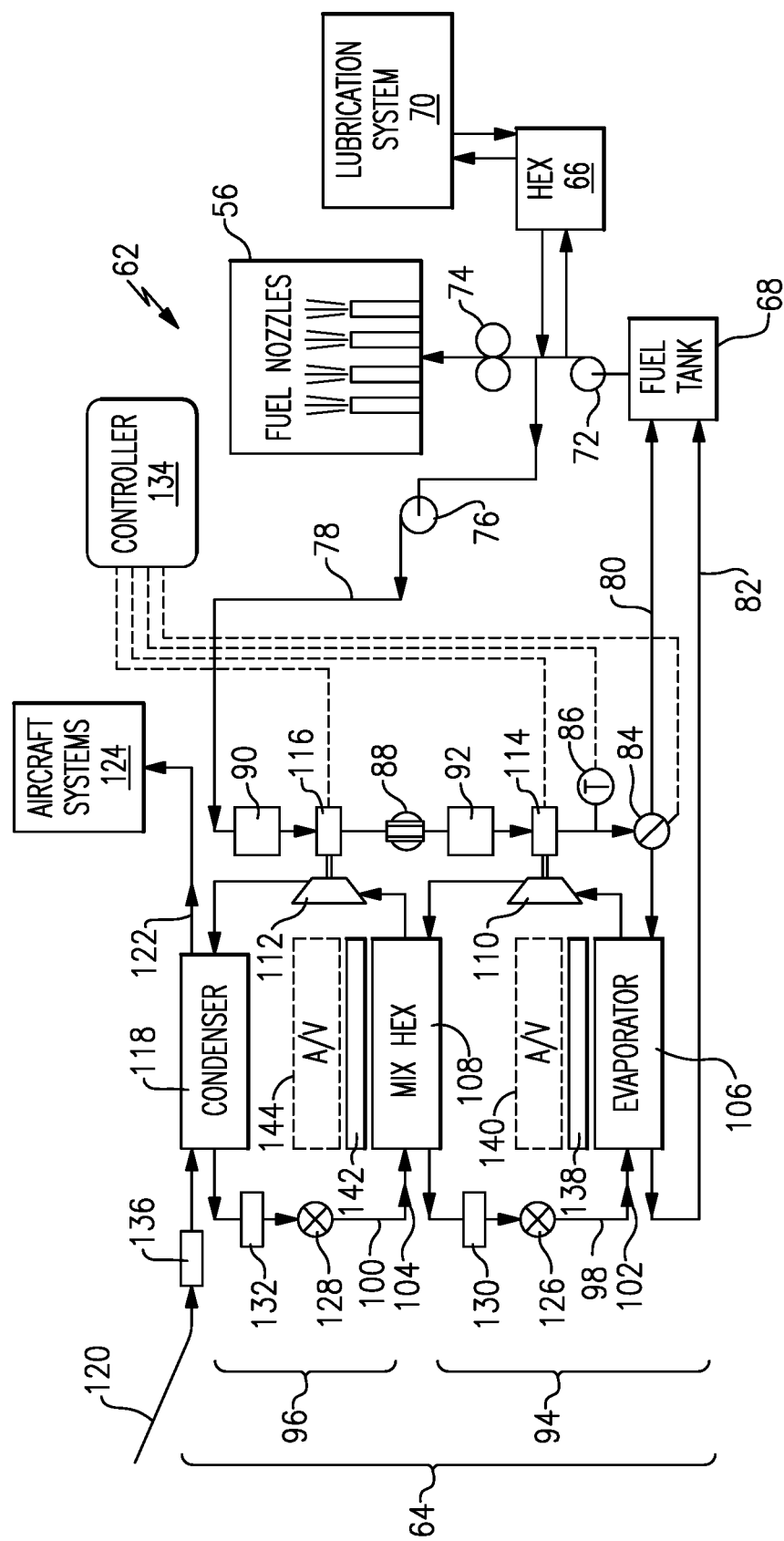
FIG. 2 is a schematic view of an example fuel system and thermal management system embodiment.

Referring to FIG. 2 with continued reference to FIG. 1, the example fuel system 62 and thermal management system (TMS) 64 are schematically shown. The fuel system 62 includes a boost pump 72 that draws fuel from the fuel tank 68. Fuel from the boost pump 72 is directed to a high pressure pump 74 that supplies fuel flow to the combustor 56 at suitable pressures and flow rates.

Fuel from the booster pump 72 is also communicated to the heat exchanger 66 to cool fluids from other engine systems. In this example, the heat exchanger 66 cools a lubricant flow from a lubrication system shown schematically at 70. It should be appreciated that the lubrication system 70 will include passages, valves and other components as may be required to supply lubricant to various engine systems. Such engine systems that receives lubricant can include the bearing systems 38 and the geared architecture 48. Moreover, although the lubrication system is disclosed and described by way of example, other systems may also utilized a flow of fuel to maintain those systems within predefined temperature ranges.

Once the fuel accepts thermal energy from the other systems, a portion will be directed to the combustor 56 and burned and excess fuel flow will be bypassed to cool other systems. In this example, fuel is routed through a passage 78. The passage 78 may include different branches that are directed to different heat loads. In this example, the passage 78 communicates fuel flow to a first heat load 90 and a second heat load 92. The first heat load 90 and the second heat load 92 can be any aircraft or engine system that requires cooling. A secondary pump 76 is provided in the passage 78 to maintain a desired pressure and flow to the heat loads 90, 92. A pressure regulating valve 88 may also be provided to regulate pressure within the passage 78 thus providing proper fuel circulation.

Fuel within the passage 78 is finally circulated to a first valve 84. The first valve 84 directs fuel either to the thermal management system 64 or back to the fuel tank 68 through a passage 80. Fuel is directed between the TMS 64 and the fuel tank at least partially depending on a measured temperature within the passage 78. In this disclosed example, a temperature sensor 86 is provided upstream of the valve 84 and communicates temperature information to a controller 134. The controller 134 operates the valve to proportionally direct fuel between the fuel tank 68 and the TMS 64 to maintain the fuel within predefined temperature limits.

The controller 134 can be may be a separate controller for the thermal management system 64 or part of the overall engine or aircraft controller (Electronic Engine Control-EEC/Full Authority Digital Engine Control-FADEC). The controller 134 as referred to in this disclosure may be a hardware device for executing software, particularly software stored in memory. The controller may include a processor. The processor may be custom made or a commercially available processor, a central processing unit (CPU), an auxiliary processor among several processors associated with the computing device, a semiconductor based microprocessor (in the form of a microchip or chip set) or generally any device for executing software instructions.

The controller 134 will include a memory that can include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.). Moreover, the memory may incorporate electronic, magnetic, optical, and/or other types of storage media. Note that the memory can also have a distributed architecture, where various components are situated remotely from one another, but can be accessed by the processor.

The software in the memory may include one or more separate programs, each of which includes an ordered listing of executable instructions for implementing logical functions. A system component embodied as software may also be construed as a source program, executable program (object code), script, or any other entity comprising a set of instructions to be performed. When constructed as a source program, the program is translated via a compiler, assembler, interpreter, or the like, which may or may not be included within the memory.

Fuel directed to the TMS 64 is cooled and sent back to the fuel system 62. In this example, fuel is directed back to the fuel tank 68, however, the cooled fuel in outlet passage 82 may be directed where needed for cooling.

The TMS 64 includes a primary vapor compression system (PVCS) 94 that directly cools the fuel and a boost vapor compression system (BVCS) 96 that cools a primary refrigerant 102 within the PVCS 94. A boost refrigerant 104 is subsequently cooled by a flow of air schematically indicated at 120. The mated PVCS 94 and BVCS 96 provide a deep cooling of the fuel to increase the available thermal capacity of the fuel.

The PVCS 94 includes a primary evaporator 106 through which fuel from first valve 84 is flowed in thermal communication with the primary refrigerant 102. The cooled fuel is returned through the passage 82. The heated primary refrigerant 102 circulates in the closed loop 98 of the PVCS 94. The PVCS 94 includes a primary compressor 110 that is driven by an electric motor 114. The electric motor 114 is controlled by the controller 134 to tailor operation to current operating conditions. The PVCS 94 further includes a primary expansion valve 126 and a dryer 130. A mixed heat exchanger 108 provides a thermal transfer link between the PVCS 94 and the BVCS 96. The heat exchanger 108 provides the dual function of a condenser for the PVCS 94 and an evaporator for the BVCS 96. The boost refrigerant 104 within the closed loop 100 of the BVCS 96 accepts heat and cools the primary refrigerant 102 to enhance the ability of the primary refrigerant 102 to accept heat and cool the fuel in the evaporator 106.

The BVCS 96 includes a boost compressor 112 driven by a second electric motor 116 that is also controlled by the controller 134. Boost refrigerant 104 is placed in thermal communication with the airflow 120 in the boost condenser 118. The BVCS 96 further includes a dryer 132 and an expansion valve 128 to further control flow through the BVCS 96. The airflow 120 utilized by the BVCS 96 can be ambient air flow from a ram air supply. Alternatively, airflow 120 may be any pressurized mix of recirculated airflow from engine and aircraft systems that is at a temperature suitable for accepting heat from the boost refrigerant 104.

An ejector 136 may be provided at the inlet of the condenser 118 to promote airflow through the condenser 118 when sufficient flow is not available during some operating conditions. The ejector 136 may be a Venturi nozzle, a jet pipe or powered by compressed bleed air tapped from other parts of the engine such as the compressor section 24.

Moreover, warmer airflow 122 exhausted from the condenser 118 is directed to aircraft systems 124 that utilize the warmer airflow. Such systems can include, for example, cabin environmental control systems, anti-icing systems, buffer air systems and other engine and/or aircraft systems. Accordingly, the airflow 122 may be utilized in other engine and/or aircraft systems and not exhausted or vented overboard.

The primary refrigerant 102 and the boost refrigerant 104 may be a suitable non-ozone depleting fluid and/or blend of fluid of known refrigerant or mixtures of refrigerants.

Fuel from the example fuel system 62 within the passage 78 is used to cool the electric motors 114, 116. The cooling of the electric motors 114, 116 expands the operational capacity of the motors 114, 116 to further enable efficient operation of the TMS 64.

The example TMS 64 may further include at least one cold plate adjacent one of the evaporator 106 and the heat exchanger 108 to cool other aircraft and/or engine systems. In one disclosed example, a cold plate 138 is provided at the primary evaporator 106 to cool avionic systems schematically indicated at 140. The heat exchanger 108 may also include a cold plate 142 to cool other aircraft systems schematically indicated at 144. The cold plates 138 and 142 would be orientated to cool components and systems that correspond with the relative temperatures at each of the evaporator 106 and the heat exchanger 108.

In operation, the fuel system 62 directs a portion of fuel through the passage 78 to cool the example heat loads 90, 92 and the electric motors 114 and 116. As appreciated, although not shown, additional valves, pumps, filters, screens, sensors, and passages may be included to direct fuel flow to specific components depending on respective heat loads.

Fuel returning from cooling various components is directed by the valve 84 to the TMS 64 when the fuel requires additional cooling to remain within defined temperature limits. As appreciated, the defined temperature limits may vary during operation and are dependent on the instant temperature that can cause degradation of the fuel. Fuel is routed to the evaporator 106 for cooling by the primary refrigerant 102 within the PVCS 94. The primary refrigerant 102 is cooled by the BVCS 96 such that the fuel is deep cooled. The cooled and chilled fuel is routed back to the fuel system 62 for use in combustion and/or for cooling.

Accordingly, the example TMS 64 provides a deep cooling of fuel within the fuel system to increase the thermal capability to absorb heat while maintaining the fuel below temperatures that can cause fuel degradation.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A gas turbine engine comprising:
   a fuel system providing a flow of fuel to a combustor; and
   a thermal management system for maintaining the fuel within a predefined temperature range, the thermal management system including a primary vapor compression system including a primary evaporator defining thermal communication between a primary refrigerant and a flow of fuel to cool the fuel and a boost vapor compression system including a boost heat exchanger defining thermal communication between the primary refrigerant and a boost refrigerant to cool the primary refrigerant and a boost condenser in thermal communication with an air stream to cool the boost refrigerant, wherein the primary vapor compression system further includes a primary compressor driven by a first electric motor and the boost vapor compression system includes a boost compressor driven by a second electric motor and at least one of the first electric motor and the second electric motor is cooled by a flow of fuel.

2. The gas turbine engine as recited in claim 1, wherein the fuel system includes a boost pump drawing fuel from a fuel tank and communicating fuel to a primary fuel pump that provides the flow of fuel to the combustor, a first valve controlling a flow of fuel to the primary evaporator, a temperature sensor measuring a temperature of the fuel upstream of the first valve and a controller receiving information from the temperature sensor and operating the first valve to control the flow of fuel to maintain the fuel within the predefined temperature range.

3. The gas turbine engine as recited in claim 2, wherein the primary vapor compression system further includes a primary compressor driven by a first electric motor and the boost vapor compression system includes a boost compressor driven by a second electric motor and at least one of the first electric motor and the second electric motor is cooled by a flow of fuel and the first valve is disposed downstream of the at least one of the electric motor and the second electric motor cooled by the flow of fuel.

4. The gas turbine engine as recited in claim 3, including a secondary fuel pump generating a fuel flow to cool the at least one of the first electric motor and the second electric motor and a pressure regulating valve for maintaining a pressure of the flow of fuel.

5. The gas turbine engine as recited in claim 4, wherein the boost heat exchanger functions as a condenser for the primary vapor compression system and as an evaporator for the boost vapor compression system.

6. The gas turbine engine as recited in claim 1, including an ejector providing a flow of cooling air to the boost condenser.

7. The gas turbine engine as recited in claim 1, wherein air warmed through the booster condenser is directed to a system that utilizes warmer air.

8. The gas turbine engine as recited in claim 1, including a cold plate in thermal communication with at least one of the booster heat exchanger or the primary evaporator for providing cooling of another aircraft system.

9. A method of managing thermal properties of a fuel for a gas turbine engine, the method comprising:

routing a flow of fuel through a primary evaporator of a primary vapor compression system to cool the fuel;

routing a flow of a primary refrigerant of the primary vapor compression system into thermal communication of a boost refrigerant within of a boost vapor compression system within a boost heat exchanger for cooling the primary refrigerant, wherein the boost heat exchanger functions as a condenser for the primary vapor compression system and as an evaporator for the boost vapor compression system;

operating at least one valve to control the flow of fuel into the primary evaporator to maintain the flow of fuel within a predefined temperature range;

cooling the boost refrigerant with an air stream through a boost condenser; and controlling operation of a primary compressor of the primary vapor compression system with a first electric motor and controlling operation of a boost compressor of the boost vapor compression system with a second electric motor to control the transfer of heat from the fuel flow to the air stream.

10. The method as recited in claim 9, including cooling a secondary system with a cold plate in thermal communication with at least one of the booster heat exchanger or the primary evaporator for cooling a secondary coolant flow.

* * * * *